Dec. 4, 1951  J. S. ASHDOWNE  2,577,560
SADDLE BAG MOUNTING FOR MOTORCYCLES
Filed July 14, 1947

INVENTOR.
JAMES S. ASHDOWNE
BY
ATTORNEYS

Patented Dec. 4, 1951

UNITED STATES PATENT OFFICE 2,577,560

SADDLEBAG MOUNTING FOR MOTORCYCLES

James S. Ashdowne, Detroit, Mich., assignor to Joseph Buegeleisen Co., Inc., Detroit, Mich., a corporation of Michigan Application July 14, 1947, Serial No. 760,747

2 Claims. (Cl. 224—32)

1

The invention relates to saddle bag mountings for motorcycles and more particularly for that type of motorcycle where the mud guard is supported by rods which extend radially upward from a portion of the frame adjacent to the wheel axle.

It is the object of the invention to obtain a simple construction of mounting which can be readily attached to such type of motorcycle and which detachably supports the saddle bag clear of the mud guard and its supporting rods. To this end the invention consists in the construction as hereinafter set forth.

Figure 1:
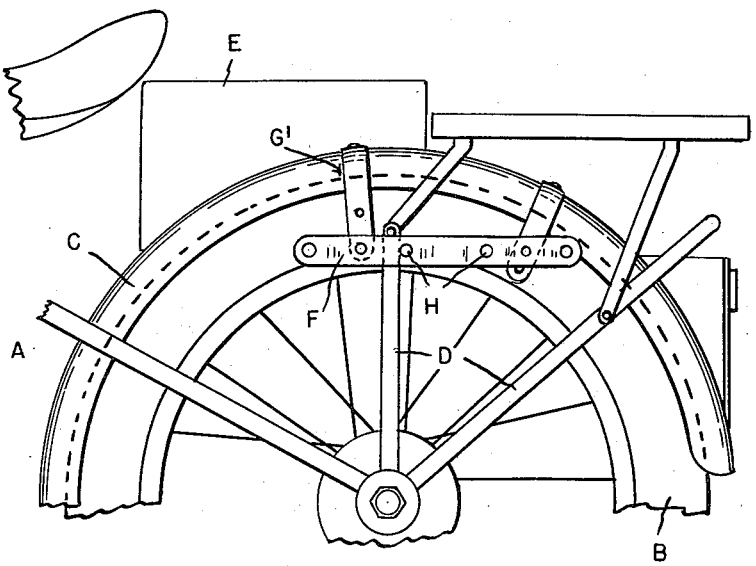
Fig. 1 is a side elevation of a portion of a motorcycle frame showing the saddle bag mounting attached thereto but with the saddle bag removed.
Figure 2:
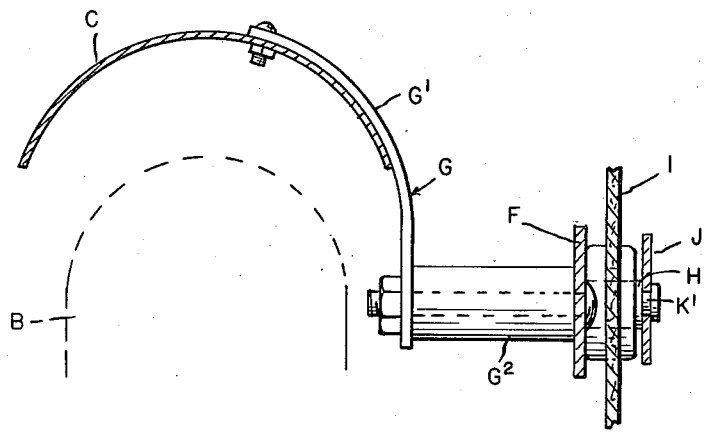
Fig. 2 is a cross section showing the saddle bag in position.
Figure 3:
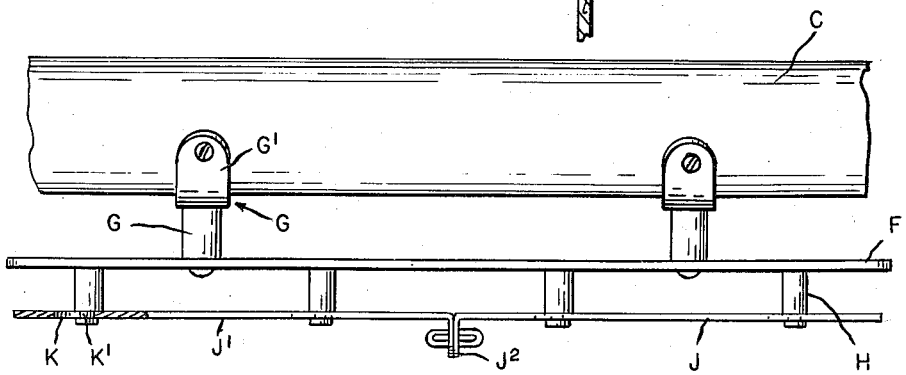
Fig. 3 is a top plan view of Fig. 1 showing the locking bar attached but the rear seat removed.

As shown in Fig. 1 A is the portion of a motorcycle frame. B is the rear wheel. C the mud guard for said wheel which is supported by a plurality of rods D extending up from a portion of the frame adjacent to the mounting for the wheel axle. Certain of these rods are also used for supporting a rear seat E over the mud guard. The mud guard is of a construction which covers the wheel but does not extend downward at the sides thereof and, therefore, does not present any surface to which a saddle bag might be directly attached. Furthermore the supporting rods for the mud guard would interfere with direct attachment thereto. I have, therefore, devised a mounting for the saddle bag of the following construction. F is a bar extending horizontally outside of the supporting rods D. G are bracket members attached to the bar F near the opposite end portions thereof and extending inward therefrom to fit over the mud guard C to which they are fixedly secured. These brackets are so positioned as to avoid interference with the rods D and to hold the bar F outside of said rods. The bar F has projecting outwardly therefrom a series of studs H for engaging eyelets in the inner wall of a saddle bag I. Each of these studs is slotted near its outer end to engage a locking bar J which latter has key slots K therein registering, respectively, with the studs. The large portion of the key slot will fit over the stud and the small portion K' will engage the slots in the studs when the bar is moved longitudinally. There are preferably two locking bars J and J' which extend from the center towards the opposite ends of the bar F and the inner ends of the bar J have inturned apertured flanges $J^2$ for engagement of a padlock. Thus when the locking bars are first engaged with the studs they are slightly separated centrally from each other. When drawn together these bars will engage the portions K' of the key slots which will secure

2 them to the studs. The brackets G are preferably formed of an angle strip portion G', one end of which is attached to the mud guard and a post $G^2$ extending outward from the opposite end of the portion G'.

The mounting as above described is exceedingly simple comprising only the bar F, the posts $G^2$, the brackets G, studs H and locking bars J and J'. The portions G' of the brackets are fashioned to fit about the mud guard at the particular points at which they are located and are easily attached by bolting to the guard.

What I claim as my invention is:

1. The combination with a saddle bag of a mounting for the same on a motorcycle, said mounting comprising a pair of brackets secured in spaced apart relation to a mud guard of the motorcycle, each of said brackets having an upper portion curved to fit over said mud guard and a downwardly extending depending portion, an outwardly projecting post at the lower end of each of said depending portions, a horizontally extending bar supported solely by means of said brackets and having its opposite ends respectively secured to the outer ends of said posts, studs projecting outwardly from said bar engageable with eyelets in the inner wall of the saddle bag and means located within the bag for locking the same to said studs.

2. The combination with a saddle bag of a mounting therefor on a motorcycle of the type in which a mud guard is supported by radially upwardly extending rods on the motorcycle frame, said mounting comprising brackets spaced lengthwise of said mud guard and secured thereto, each of said brackets having an arcuate upper portion fitting over said mud guard and a downwardly extending depending portion, an outwardly projecting post at the lower end of each of said depending portions, a horizontally extending bar located outside of said supporting rods and secured at opposite ends to said posts, said bar being clear of said rods and supported solely by means of said brackets, studs projecting outwardly from said bar engaging eyelets in the inner wall of the saddle bag and a locking bar located within the bag for engaging said studs to secure the bag thereto.

JAMES S. ASHDOWNE.

REFERENCES CITED

The following references are of record in the file of this patent:

UNITED STATES PATENTS

| Number | Name | Date |
|---|---|---|
| 2,010,479 | Dennis | Aug. 6, 1935 |
| 2,266,220 | Larson | Dec. 16, 1941 |
| 2,423,003 | Buegeleisen | June 24, 1947 |

FOREIGN PATENTS

| Number | Country | Date |
|---|---|---|
| 446,331 | Great Britain | Apr. 28, 1936 |